United States Patent Office 3,336,411
Patented Aug. 15, 1967

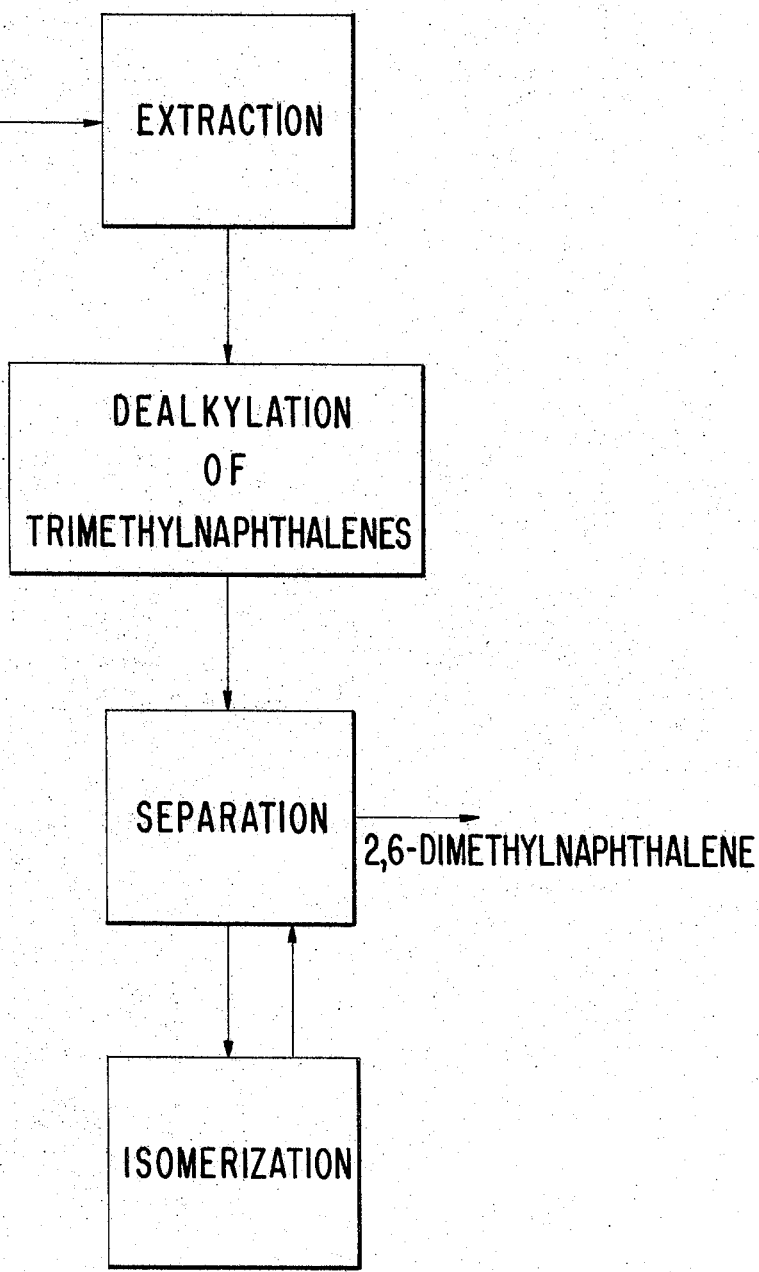

3,336,411
PROCESS FOR PRODUCING 2,6-DIMETHYL-NAPHTHALENE
Alvin L. Benham, Littleton, Colo., assignor to Marathon Oil Company
Filed Oct. 9, 1964, Ser. No. 402,806
15 Claims. (Cl. 260—672)

This invention relates to the production of 2,6-dimethylnaphthalene from mixtures of mono-, di-, and tri-methylnaphthalenes. This invention also relates to the production of 2,6-dimethylnaphthalene from light catalytic cycle oil.

The compound 2,6-dimethylnaphthalene melts at about 110° C. to 111° C. and has a boiling point of from 261° C. to 262° C. at 762 mm. of mercury. This material is extremely stable at high temperatures. It can easily be converted to its acid, 2,6-naphthalenedicarboxylic acid, which has a number of uses, such as in polyester films, fibers and molds and in plasticizers for vinyl and styrene plastics.

The present invention provides a method for producing 2,6-dimethylnaphthalene free from the nine other dimethylnaphthalene isomers. The process comprises forming a stream containing mono-, di-, and tri-methylnaphthalenes and partially dealkylating this stream to convert the trimethylnaphthalenes to dimethylnaphthalenes. Any 2,6-dimethylnaphthalene formed by the partial dealkylation reaction may be separated from the other isomers. Following this, the stream, now primarily containing dimethylnaphthalene isomers, is conveyed to an isomerization reactor where the dimethylnaphthalenes are converted to 2,6-dimethylnaphthalene. The 2,6-dimethylnaphthalene is then separated from the remaining isomers and is isolated. The residual isomeric dimethylnaphthalenes may then be recycled to the isomerization reactor to produce further 2,6-dimethylnaphthalene.

In the drawing, the single figure is a diagrammatic flow sheet of the method of the invention.

The starting material used in the instant process is light catalytic cycle oil. This material, which is readily available from petroleum refineries, is a catalytic cycle oil fraction boiling between 400° and 600° F. Light catalytic cycle oil usually contains from about 35% to 50% by weight of methyl substituted naphthalenes, including mono-, di- and tri-methylnaphthalenes, but only a few percent by weight of 2,6-dimethylnaphthalene. Other sources capable of forming mixtures of methyl substituted naphthalenes may, of course, be used.

The light catalytic cycle oil is first treated to produce a stream rich in methyl substituted naphthalenes. By solvent extraction, a feed stream containing from 80% to 90% by weight of alkyl substituted naphthalenes may be prepared. This extraction can be carried out in the conventional manner using any suitable solvent composition, such as a mixture of furfural, furfuryl alcohol and water. A preferred solvent comprises furfural, furfuryl alcohol and water in a 36:54:10 volume percent mixture. With a seven foot extraction zone, continuous extraction in an R.D.C. extractor using a solvent to oil ratio of 2 has given an extract containing 85% by weight alkylnaphthalenes.

The feed stream is then conveyed to a partial dealkylation reactor where the trimethylnaphthalenes are converted to dimethylnaphthalenes. This may be done by thermal treament in the presence of hydrogen. The partial dealkylation will produce isomeric dimethylnaphthalenes. Although there are 10 dimethylnaphthalene isomers, if the dealkylation reaction is conducted under suitable conditions, considerable amounts of 2,6-dimethylnaphthalene may be produced at this stage of the process.

Suitable conditions for the partial dealkylation comprise heating the feed stream to a temperature of from about 400° C. to 700° C., at a pressure of from about 250 to 1000 p.s.i., with residence times of from about 5 to 50 seconds, in the presence of hydrogen gas. Preferably, the mole ratio of hydrogen to the alkylnaphthalene feed is from about 1:1 to 8:1 moles of hydrogen per mole of alkylnaphthalene feed. The partial dealkylation could also be conducted using a dealkylation catalyst, such as chromia-alumina or silica-alumina catalysts. When using a dealkylation catalyst, the reaction is conducted under conditions identical with those for thermal dealkylation, except that the preferred temperature range is from 350° C. to 650° C.

Instead of conveying the entire alkylnaphthalene extract from the extraction step to the dealkylation reaction, the extract may first be fractionally distilled to produce a cut having an initial boiling point of at least 520° F., and containing that fraction of the extract boiling above 520° F. This cut, which is rich in trimethylnaphthalenes, is then conveyed to the dealkylation reactor. A cut having a boiling range of from 500° to 520° F. bypasses the partial dealkylation reaction and is conveyed to the next stage of the process. As the 500°–520° F. cut contains substantial amounts of dimethylnaphthalenes, some of which would be converted to monomethylnaphthalenes by the partial dealkylation reaction, this modification will increase the efficiency of the operation.

The product stream emerging from the dealkylation reactor is rich in dimethylnaphthalene isomers. It does, however, contain some 2,6-dimethylnaphthalene. Since the subsequent isomerization reaction establishes an equilibrium or near-equilibrium between the dimethylnaphthalene isomers, it is desirable to separate the 2,6-dimethylnaphthalene formed in the dealkylation reaction prior to the isomerization reaction. Although this is not essential, the potential yield will be diminished, if the feed to the isomerization reactor contains 2,6-dimethylnaphthalene. The 2,6-dimethylnaphthalene can be separated from its isomers at this stage of the process by a fractional crystallization step. In a preferred embodiment, a six-stage crystallization at temperatures of −17°, 54°, 143°, 190°, 212° and 223° F. is used.

The product stream from the partial dealkylation reactor has a wide boiling range, usually from about 400° to 600° F. Although this stream can be conveyed directly to the fractional crystallizer, the yield of the process is improved by first fractionally distilling this effluent to separate three cut. A first cut, boiling below 500° F., contains predominately non-naphthalene materials, naphthalene, and monomethylnaphthalenes. This cut is removed from the system and conveyed to other uses. A second cut, having a boiling range of from 500° to 520° F., consists largely of dimethylnaphthalenes. This cut is subjected to fractional crystallization to isolate the 2,6-dimethylnaphthalene present, with the other products of fractional crystallization then being conveyed to the isomerization reactor. A third cut, boiling above 520° F. and containing large amounts of trimethylnaphthalenes, is recycled to the dealkylation reactor. In this manner, optimum results are achieved since the bulk of the feed materials incapable of undergoing isomerization to yield 2,6-dimethylnaphthalene are not subjected to the isomerization reaction.

The next stage in the process is the isomerization reaction, which establishes an equilibrium or near equilibrium between 2,6-dimethylnaphthalene and its isomers thereby to maximize the yield of 2,6-dimethylnaphthalene. Depending upon which of the above procedures was followed, the feed to the isomerization reaction will be one or more of the following: (a) the effluent from the partial dealkylation reaction, (b) the products formed by fractionally crystallizing the effluent from the partial dealkylation reaction to isolate 2,6-dimethylnaphthalene, (c) the products formed by fractionally crystallizing that cut of the effluent from the partial dealkylation reaction which has a boiling range of 500°–520° F. in order to isolate 2,6-dimethylnaphthalene, (d) the cut of extract which has a boiling range of 500°–520° F., and (e) the products formed by fractionaly crystallizing the cut of extract having a boiling range of 500°–520° F., to isolate 2,6-dimethylnaphthalene.

The isomerization reaction is conducted by passing the mixture of dimethylnaphthalenes in the presence of hydrogen gas and in contact with a silica-alumina catalyst through a high temperature fixed bed reactor. Suitable conditions for this reaction include the following: pressures of from atmospheric (about 14 p.s.i.) to 500 p.s.i., hydrogen to alkylnaphthalene ratios of from about 0.5:1 to 4:1 moles of hydrogen per mole of alkylnaphthalene, temperatures of from about 250° to 400° C. and residence times of 5 to 50 seconds. Instead of the silica-alumina catalyst, a silica-alumina-zirconia catalyst can be used, under the same conditions. When the reaction is conducted in a high temperature fixed bed reactor, the reaction must be stopped periodically to allow for decoking of the catalyst. To eliminate the plant shutdown necessitated by the decoking, the isomerization can be conducted in a fluidized bed reactor, employing two reactors, one to isomerize and the other to decoke in a continuous manner.

Following the isomerization reaction, the stream, now rich in 2,6-dimethylnaphthalene, is conveyed to a separator where this material is isolated. This can be done by a fractional crystallization. In a preferred embodiment, the effluent stream from the isomerization reactor will be conveyed to the same separating unit used to treat the stream following the dealkylation reaction. After the 2,6-dimethylnaphthalene is removed from the separator, the remaining isomeric dimethylnaphthalenes can be recycled to the isomerization reactor to produce further 2,6-dimethylnaphthalene.

The following example will serve to illustrate the method of this invention.

*Example*

A light catalytic cycle oil boiling at from 400° to 600° F. and containing 35% by weight of methyl substituted naphthalenes and 4% by weight of 2,6-dimethylnaphthalene is extracted with a solvent mixture comprising 36:54:10 volume percent furfural, furfuryl alcohol and water to isolate a fraction rich in methyl substituted naphthalenes. The solvent is removed by distillation and a feed stream containing 89% by weight of methyl substituted and alkyl naphthalenes is thereby produced. The distribution of materials in this feed stream is approximately 11% low boiling non-naphthalene materials, 11% monomethylnaphthalenes, 45% dimethylnaphthalenes, and 33% trimethylnaphthalenes.

The feed stream is conveyed to a dealkylation reactor having an inverse space velocity of 50–60 liters/gm./sec. at a temperature of 625° C. and a pressure of 500 p.s.i. in the presence of 5 moles of hydrogen gas per mole of feed stream. This partially dealkylates the trimethylnaphthalenes and produces an effluent containing 56% dimethylnaphthalenes, including 10% 2,6-dimethylnaphthalene, and 5% trimethylnaphthalene. This effluent, having a boiling range of from 400°–600° F. is distilled to prepare a fraction boiling at 500°–520° F. and containing approximately 20% 2,6-dimethylnaphthalene.

The 500°–520° F. boiling out of the effluent from the dealkylation reactor is fractionally crystallized to remove the 2,6-dimethylnaphthalene. The other products of the fractional crystallization step are conveyed to an isomerization reactor where they are contacted with a silica-alumina catalyst in the presence of 4 moles of hydrogen per mole of feed stream, at a temperature of 350° C. and a pressure of 500 p.s.i. with an inverse space velocity of 0.15 gm. catalyst/cc. liquid feed/hour. This produces a substantial amount of 2,6-dimethylnaphthalene. The composition of the effluent from the isomerization reactor is as follows: 8% non-naphthalenes, 14% 2,6-dimethylnaphthalene, 45% other dimethylnaphthalenes, 29% trimethylnaphthalene, and 4% monomethylnaphthalenes.

The effluent from the isomerization reactor is conveyed to the same fractional crystallizer used to treat the products of the dealkylation reactor. The 2,6-dimethylnaphthalene is isolated by this fractional crystallization and the other products of the isomerization reaction are recycled to the isomerization reactor to produce further 2,6-dimethylnaphthalenes.

Thus it can be seen that the present invention provides an economical and continuous process for producing high yields of 2,6-dimethylnaphthalene from readily available light catalytic cycle oil feedstocks.

While the invention has been described with reference to certain preferred embodiments, those skilled in the art will realize that numerous modifications may be made in the process without departing from the spirit of the invention as expressed in the following claims.

What is claimed is:

1. A process for producing 2,6-dimethylnaphthalene comprising:
   partially dealkylating an alkylnaphthalene stream containing trimethylnaphthalene to form substantial amounts of isomeric dimethylnaphthalenes,
   isomerizing the dimethylnaphthalenes to produce substantial amounts of 2,6-dimethylnaphthalene, and
   separating the 2,6 - dimethylnaphthalene from its isomers.

2. The process of claim 1, further comprising separating 2,6-dimethylnaphthalene formed by said partial dealkylation prior to isomerizing the isomeric dimethylnaphthalenes.

3. The process of claim 1, wherein the stream containing trimethylnaphthalene is heated to a temperature in the range of from about 400° to 700° C. at a pressure of between about 250 and 1000 p.s.i. in the presence of hydrogen gas with a residence time of 5–50 seconds to partially dealkylate said trimethylnaphthalene and thereby form substantial amounts of isomeric dimethylnaphthalenes.

4. The process of claim 1, wherein the stream containing trimethylnaphthalene is partially dealkylated by contacting it with a catalyst selected from the group consisting of chromia-alumina and silica-alumina at a temperature betwen 350° to 650° C., at a pressure between 250 and 1000 p.s.i., in the presence of hydrogen gas, with a contact time of 5–50 seconds.

5. The presence of claim 1, wherein said isomeric dimethylnaphthalene are isomerized to form substantial amounts of 2,6-dimethylnaphthalene by heating to a temperature of between about 250° and 400° C. at a pressure of from about 14 to 500 p.s.i. in the presence of hydrogen gas and a catalyst selected from the group consisting of silica-alumina and silica-alumina-zirconia with residence times of from 5 to 50 seconds.

6. A process for producing 2,6-dimethylnaphthalene comprising:
   extracting light catalytic cycle oil to form a mixture containing monomethylnaphthalene, dimethylnaphthalene, and trimethylnaphthalene,
   partially dealkylating the trimethylnaphthalene in said mixture to form substantial amounts of isomeric dimethylnaphthalenes by heating said mixture to a temperature in the range of from about 400° to 700° C. at a pressure of from about 250 to 1000 p.s.i. in the presence of hydrogen gas, the mole ratio of said hydrogen gas to said mixture being in the range of from 1:1 to 8:1, separating the 2,6-dimethylnaphthalene formed by said partial dealkylation, isomerizing the remaining dimethylnaphthalene isomers to produce further amounts of 2,6-dimethylnaphthalene by heating said dimethylnaphthalenes to a temperature of from about 250° to 400° C. at a pressure of from about 14 to 500 p.s.i. in the presence of hydrogen gas and a silica-alumina catalyst, the mole ratio of hydrogen to said isomer being in the range of from 0.5:1 to 4:1, and separating the 2,6-dimethylnaphthalene from its isomers.

7. The process of claim 6 wherein 2,6-dimethylnaphthalene is separated from its isomers by fractional crystallization.

8. The process of claim 6 wherein the products of said isomerization reaction are fractionally crystallized to isolate 2,6-dimethylnaphthalene and the remaining isomeric dimethylnaphthalenes are recycled for further isomerization to produce 2,6-dimethylnaphthalene.

9. The process of claim 6 wherein said mixture containing monomethylnaphthalene, dimethylnaphthalene and trimethylnaphthalene is fractionally distilled to produce a cut having an initial boiling point of 520° F. and containing that fraction of said mixture boiling above 520° F., and wheren said cut is partially dealkylated to convert the trimethylnaphthalenes therein to dimethylnaphthalenes.

10. The process of claim 6 wherein the effluent from said partial dealkylation reaction is fractionally distilled to produce a first cut having a boiling range of from 500° F. to 520° F. and a second cut having a boiling range in excess of 520° F., said first cut being treated to separate the 2,6-dimethylnaphthalene contained therein and said second cut being recycled to said partial dealkylation reaction.

11. A process for producing 2,6-dimethylnaphthalene comprising:

extracting light catalytic cycle oil to form a mixture containing monomethylnaphthalene, dimethylnaphthalene and trimethylnaphthalene, partially dealkylating the trimethylnaphthalene in said mixture to form substantial amounts of isomeric dimethylnaphthalene by heating said mixture to a temperature in the range of from about 350° C. to 650° C. at a pressure of from about 250 to 1000 p.s.i. in the presence of hydrogen gas and a catalyst selected from the group consisting of chromia-alumina and silica-alumina, the mole ratio of hydrogen to said mixture being in the range of from 1:1 to 8:1, separating the 2,6-dimethylnaphthalene formed by said partial dealkylation, isomerizing the remaining dimethylnaphthalene isomers to produce further amounts of 2,6-dimethylnaphthalene by heating said dimethylnaphthalenes to a temperature of from about 250° to 400° C. at a pressure from about 14 to 500 p.s.i. in the presence of hydrogen gas and a silica-alumina catalyst, the mole ratio of hyrdogen to said isomers being in the range of from 0.5:1 to 4:1, and separating the 2,6-dimethylnaphthalene from its isomers.

12. The process of claim 11 wherein 2,6-dimethylnaphthalene is separated from its isomers by fractional crystallization.

13. The process of claim 11 wherein the products of said isomerization reaction are fractionally crystallized to isolate 2,6-dimethylnaphthalene and the remaining isomeric dimethylnaphthalenes are recycled for further isomerization to produce 2,6-dimethylnaphthalene.

14. The process of claim 11 wherein said mixture containing monomyethylnaphthalene, dimethylnaphthalene and trimethylnaphthalene is fractionally distilled to produce a cut having an initial boiling point of 520° F. and cnotaining that fraction of said mixture boiling above 520° F., and wherein said cut is partially dealkylated to convert the trimethylnaphthalenes there to dimethylnaphthalenes.

15. The process of claim 11 wherein the effluent from said partial dealkylation reaction is fractionally distilled to produce a first cut having a boiling range from 500° F. to 520° F. and a second cut having a boiling range in excess of 520° F., said first cut being treated to separate the 2,6-dimethylnaphthalene contained therein and said second cut being recycled to said partial dealkylation reaction.

References Cited
UNITED STATES PATENTS

| | | | |
|---|---|---|---|
| 3,153,676 | 10/1964 | Allen et al. | 260—672 X |
| 3,213,153 | 10/1965 | Mills | 260—672 |
| 3,235,615 | 2/1966 | Allen et al. | 260—672 X |
| 3,249,644 | 5/1966 | Hahn | 260—672 X |
| 3,270,074 | 8/1966 | Paulson | 260—672 X |

DELBERT E. GANTZ, *Primary Examiner.*

C. R. DAVIS, *Assistant Examiner.*